(12) United States Patent
Ruiz et al.

(10) Patent No.: US 10,137,634 B2
(45) Date of Patent: Nov. 27, 2018

(54) HYBRID ELECTROSTATIC 3-D PRINTER USING LASER FUSING

(71) Applicant: Xerox Corporation, Norwalk, CT (US)

(72) Inventors: Erwin Ruiz, Rochester, NY (US); Paul J. McConville, Webster, NY (US); Chu-heng Liu, Penfield, NY (US); James A. Winters, Alfred Station, NY (US); Jason M. LeFevre, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 15/140,589

(22) Filed: Apr. 28, 2016

(65) Prior Publication Data

US 2017/0312984 A1 Nov. 2, 2017

(51) Int. Cl.
*B29C 64/20* (2017.01)
*B33Y 30/00* (2015.01)
(Continued)

(52) U.S. Cl.
CPC ............ *B29C 64/20* (2017.08); *B22F 3/1055* (2013.01); *B29C 64/153* (2017.08);
(Continued)

(58) Field of Classification Search
CPC ......... B33Y 10/00; B33Y 30/00; B29C 64/20; B29C 64/264; B29C 64/268;
(Continued)

(56) References Cited

U.S. PATENT DOCUMENTS

| | | |
|---|---|---|
| 5,088,047 A | 2/1992 | Bynum |
| 5,155,324 A | 10/1992 | Deckard et al. |

(Continued)

FOREIGN PATENT DOCUMENTS

| | | | |
|---|---|---|---|
| WO | 2008096105 A1 | 8/2008 | |
| WO | WO-2008096105 A1 * | 8/2008 | ......... G03G 15/1625 |

OTHER PUBLICATIONS

Jason B. Jones, David I. Wimpenny, Greg J. Gibbons, (2015),"Additive manufacturing under pressure", Rapid Prototyping Journal, vol. 21 Iss 1 pp. 89-97.

(Continued)

*Primary Examiner* — Seyed Masoud Malekzadeh
*Assistant Examiner* — Lawrence D. Hohenbrink, Jr.
(74) *Attorney, Agent, or Firm* — Gibb & Riley, LLC

(57) ABSTRACT

A 3-D printer includes a development station positioned to electrostatically transfer layers of material to an intermediate transfer surface, and a transfer station adjacent the intermediate transfer surface. The transfer station is positioned to receive the layers as the intermediate transfer surface moves past the transfer station. Also, a platen is included that moves relative to the intermediate transfer surface. The intermediate transfer surface transfers a layer of the material to the platen each time the platen contacts one of the layers on the intermediate transfer surface at the transfer station to successively form a freestanding stack of the layers on the platen. A fusing station is positioned to apply light to each layer, after each layer is transferred from the transfer station to the platen. The fusing station selectively applies the light to sinter a portion of the material within the layer.

17 Claims, 22 Drawing Sheets

(51) Int. Cl.
*B29C 64/264* (2017.01)
*B22F 3/105* (2006.01)
*B33Y 10/00* (2015.01)
*B29C 64/153* (2017.01)
*B29C 64/35* (2017.01)
*B29C 64/205* (2017.01)
*B29C 64/223* (2017.01)
*B29K 105/00* (2006.01)

(52) U.S. Cl.
CPC .......... *B29C 64/205* (2017.08); *B29C 64/223* (2017.08); *B29C 64/264* (2017.08); *B29C 64/35* (2017.08); *B33Y 10/00* (2014.12); *B33Y 30/00* (2014.12); *B22F 2003/1056* (2013.01); *B29K 2105/251* (2013.01)

(58) Field of Classification Search
CPC ... B29C 64/106; B29C 64/118; B29C 64/141; B29C 64/147; B29C 64/153; B29C 67/0051; B22F 3/008; B29K 2105/251; G03G 15/14; G03G 15/224
USPC ................. 425/174.4, 375; 399/320, 336
See application file for complete search history.

(56) References Cited

U.S. PATENT DOCUMENTS

| | | | |
|---|---|---|---|
| 5,354,414 A | 10/1994 | Feygin | |
| 6,206,672 B1* | 3/2001 | Grenda | G03G 15/1605 264/484 |
| 6,280,771 B1* | 8/2001 | Monkhouse | B29C 64/165 424/422 |
| 7,250,238 B2 | 7/2007 | Fromm et al. | |
| 7,270,408 B2 | 9/2007 | Odell et al. | |
| 7,851,549 B2 | 12/2010 | Sacripante et al. | |
| 8,470,231 B1 | 6/2013 | Dikovsky et al. | |
| 8,488,994 B2 | 7/2013 | Hanson et al. | |
| 8,879,957 B2 | 11/2014 | Hanson et al. | |
| 9,193,110 B2 | 11/2015 | Pridoehl et al. | |
| 2004/0081573 A1 | 4/2004 | Newell | |
| 2005/0167872 A1 | 8/2005 | Tsubaki et al. | |
| 2013/0186558 A1* | 7/2013 | Comb et al. | B29C 67/0051 156/277 |
| 2014/0134334 A1 | 5/2014 | Pridoehl et al. | |
| 2015/0024169 A1 | 1/2015 | Martin | |
| 2015/0024309 A1 | 1/2015 | Martin | |
| 2015/0142159 A1 | 5/2015 | Chang | |
| 2015/0145174 A1 | 5/2015 | Comb | |
| 2016/0200084 A1* | 7/2016 | Hays et al. | B33Y 10/00 156/62.2 |
| 2016/0339542 A1* | 11/2016 | Paetz | G03G 15/224 |
| 2017/0192377 A1* | 7/2017 | Batchelder | B33Y 30/00 |

OTHER PUBLICATIONS

European Application No. 17166861.9, European Search Report dated Nov. 8, 2017, pp. 1-11.

* cited by examiner

HYBRID ELECTROSTATIC 3-D PRINTER USING LASER FUSING

BACKGROUND

Systems and methods herein generally relate to three-dimensional (3-D) printing processes that use electrostatic printing processes.

Three-dimensional printing can produce objects using, for example, ink-jet printers. In many systems, a platform moves below an ink-jet to form a layer of build and support materials, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface, development stations positioned to electrostatically transfer different materials to the intermediate transfer surface, and a transfer station adjacent the intermediate transfer surface. The transfer station is positioned to receive layers of the different materials as the intermediate transfer surface moves past the transfer station. Thus, the development stations and the transfer station are positioned relative to the intermediate transfer surface such that a point on the intermediate transfer surface, when the intermediate transfer surface moves in a process direction, first passes the development stations and then passes the transfer station.

Such structures also include a platen moving relative to the intermediate transfer surface. The intermediate transfer surface transfers a layer of the different materials to the platen each time the platen contacts one of the layers on the intermediate transfer surface at the transfer station to successively form a freestanding stack of the layers on the platen. In addition, an adhesive station can be positioned to supply adhesive to the platen (or the layers thereon). Such adhesive promotes transfer of the layers from the intermediate transfer surface to the layers on the platen at said transfer station.

Also, a laser fusing station is positioned to apply laser light to each the layer immediately after the layer is transferred from the transfer station to the platen. The laser fusing station selectively applies the laser light differently to the different materials within the layer to fuse together portions (e.g., portions of build material) of the different materials within the layer. However, the laser fusing station does not apply the laser light to a second portion of the different materials (e.g., support material) within the layer. Thus, the laser light heats the different materials to fuse the portions of build material together, without heating the support material to leave the support material as a loose, unbound material. The portions of build material to which laser light is applied are less than all of the layer (thus, and these portions of build material and the support material are different portions within the layer).

The 3-D printer can also optionally include a material removal station positioned to remove the support material of the different materials within the layer to separate the portions of build material of the different materials from the support material of the different materials and leave a 3-D printed part. For example, the material removal station can include an acoustic vibrator, a solvent rinsing device, a pressurized air blower, etc.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
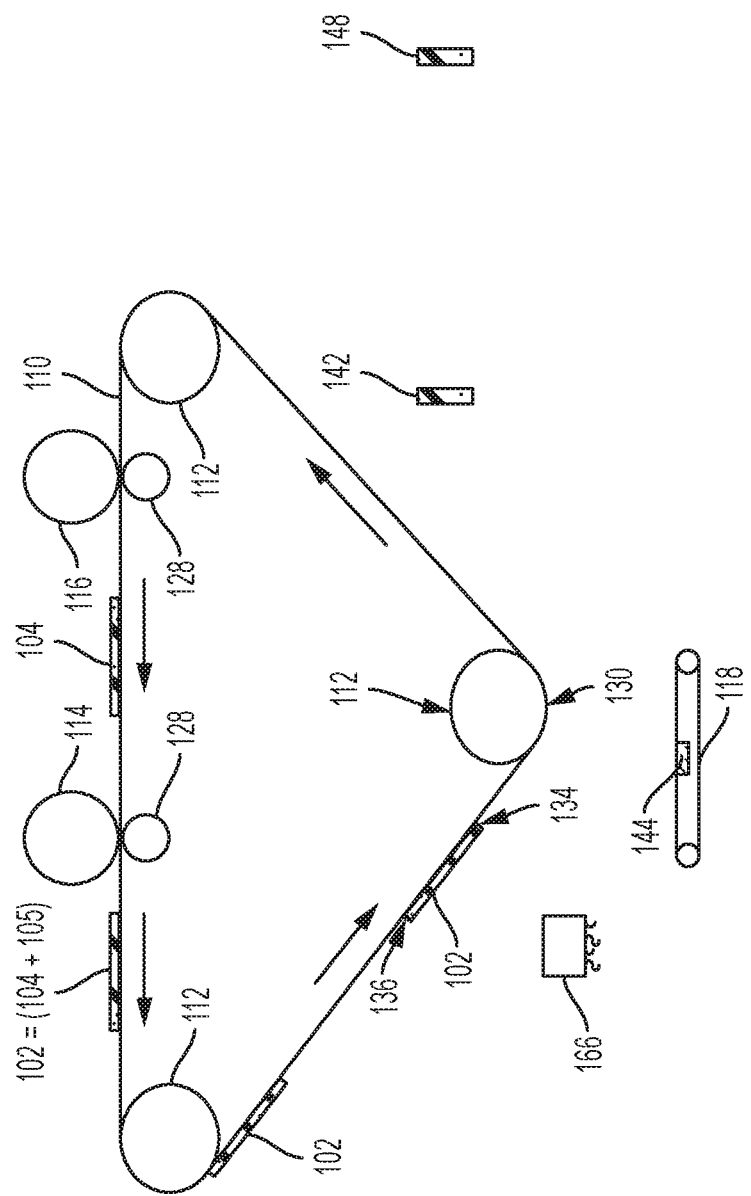
FIGS. 1-5 are schematic cross-section diagrams partially illustrating printing devices herein.

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the thermal management is a challenge because of the high temperatures used to transfer the material from the ITB to a platen, where the ITB is cooled before returning to the development device(s). Additionally, with 3-D printing that uses electrostatic processes, the mechanical integrity of the printed material may be compromised if it is very thin, and the transfer process can impose stripping shear forces that damage the material.

In order to address such issues, this disclosure provides a hybrid architecture that combines electrostatic printing with laser sintering. This involves using an electrostatic system to create layers of materials such as thermoplastics, ceramics, etc., and uses a laser to digitally fuse the layers in order to create a 3-D part. The devices and methods herein take advantage of the fast image and material management process of electrostatic printing, in order to digitally manage different printed materials, and then utilizes a laser to sinter the functional/engineering materials. Further, these methods and devices do not use heat at the transfer nip and do not perform post-transfer heated roller fusing, which avoids high temperatures used to transfer and fuse the material. Thus, the processing herein is relatively cool, and limits any pausing needed to allow structures to cool down (and does not require additional cooling stations) which makes the 3-D printing process faster and the devices less expensive.

The devices and methods herein can use a series of photoreceptor stations, one for each different material. Each of the stations develops and transfers an image into an intermediate transfer belt (ITB) electrostatically. The multiple material images are combined into a single developed layer on the ITB. The developed layer is then transferred to a surface build plate (platen) electrostatically, or using adhesive on the platen to help the developed layer remain attached. Once the developed layer has been transferred into the platen, the platen moves to the laser sintering station. The sintering station fuses the material particles in order to create a solid part. Once the sintering is performed, the platen moves to the home (initial) position to repeat the process and add the next layer. This process repeats until a solid part is created.

In different examples presented herein, the support material may comprise a type of material that the laser will not fuse or melt (e.g., ceramic, glass beads, etc.). By not sintering, the support material stays in powder state. The powdered material can be removed mechanically by vibrations or air pressure (and the support material can be recovered and reused). Alternatively, the support material can be dissolved chemically (or by water), without affecting the build material. Also, material selection is managed, as are fusing characteristics, to achieve a match of post-fusing material shrinkage characteristics.

Thus, the devices and methods herein are able to create parts or assemblies with multiple materials and colors, digitally manage and combine multiple materials in order to create new material properties, and provide the ability to optimize laser power per material. This eliminates heat management issues by not heating the ITB, and this makes the printing faster. This also takes advantage of fast electrostatic printing processes to create 3-D items faster.

As shown, for example, in FIG. 1, exemplary three-dimensional (3-D) printers herein include, among other components, an intermediate transfer belt 110 (ITB) supported on rollers 112, one or more printing/development units such as a first printing component (e.g., development device 116), and a second printing component (e.g., development device 114). Thus, as shown in FIG. 1, the first printing component 116 is positioned to electrostatically transfer a first material 104, the build material, such as a (potentially dry) powder polymer-wax material (e.g., charged 3-D toner) to the ITB 110. The electrostatic transfer occurs by way of charge difference between the belt (produced by charge generator 128, for example) and the material being transferred 104. The second printing component 114 (which can also be, for example, a photoreceptor) is also positioned to electrostatically transfer a second material 105 (e.g., the support material) to a location of the ITB 110 where the first material 104 is located on the ITB 110.

In the drawings, the combination of the build material 104 and the support material 105 is shown as element 102, and is sometimes referred to as a "developed layer." The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

In FIG. 1, item 118 is a platen (which can include an acoustic vibrator element 144), item 142 is a fusing station (e.g., laser), item 166 is an adhesive application station, and item 148 is a support material removal station. Additionally, item 130 is a transfer nip, and items 134 and 136 denote the leading and trailing edges of each developed layer 102.

Devices herein can include only one development device, or can include many. Therefore, the remaining drawings illustrate different color development stations 152-158 (shown in FIG. 2) positioned to electrostatically transfer different color build materials (e.g., items 103 and 104) to an intermediate transfer belt (ITB 110); and at least one support material development station 150 positioned to electrostatically transfer support material to a location of the ITB 110 where the build materials are located on the ITB 110. For example, each different development station 152-158 can provide a color of build material that is different from the colors of the build materials supplied by other development stations 152-158. The color of the support material provided by development station 150 is not highly relevant because the support material is eventually removed from the final structure, as discussed below.

Additionally, the platen 118 (which can be a surface or belt) is adjacent the ITB 110. In this example, the platen 118 is a vacuum belt. Patterned layers 102 of build and support material are transferred from the development devices 152-158 to the intermediate transfer belt 110, and eventually to the platen 118 at the transfer station 130.

Figure 2:
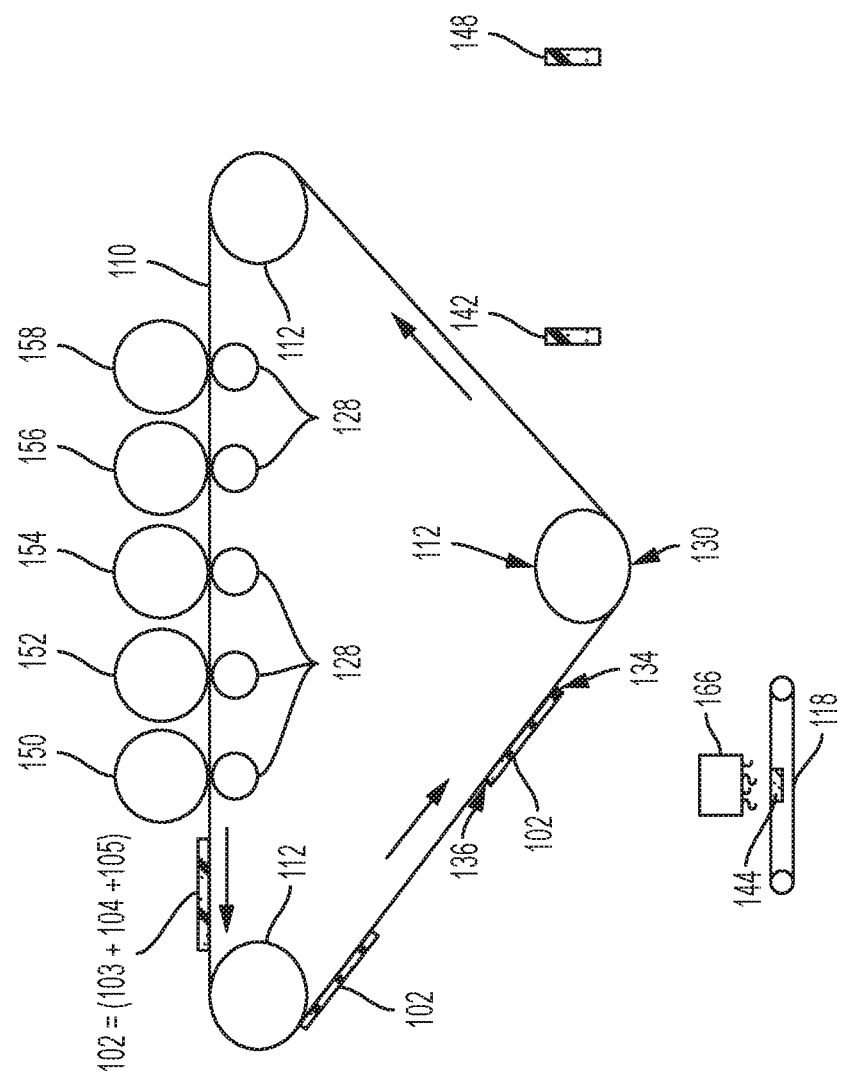

As shown in FIG. 2, the transfer station 130 is adjacent the ITB 110. The transfer station 130 includes a roller 112, on one side of the ITB 110, supporting the ITB 110. The transfer station 130 is positioned to receive the layers 102 as the ITB 110 moves to the transfer station 130. More specifically, the build material development stations 152-158, the support material development station 150, and the transfer station 130 are positioned relative to the ITB 110 such that a layer 102 on the ITB 110, when the ITB 110 is moving in a process direction, first passes the build material and support material development stations 150-158, and then passes the transfer station 130.

Therefore, the build and support material that is printed in a pattern on the ITB by each separate development device 150-158, is combined together in the developed layers 102 to represent a specific pattern having a predetermined length. Thus, as shown in FIG. 2, each of the developed layers 102 has a leading edge 134 oriented toward the processing direction in which the ITB 110 is moving (represented by arrows next to the ITB 110) and a trailing edge 136 opposite the leading edge 134.

Figure 3:
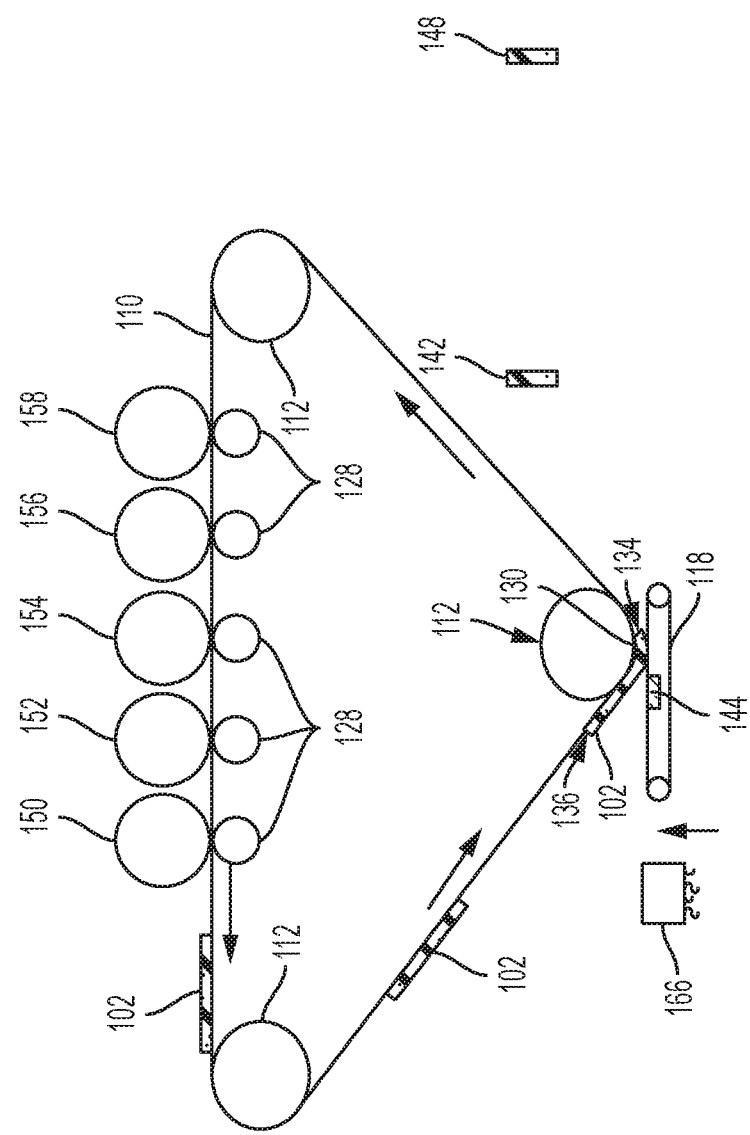

As shown by the vertical arrow in FIG. 3, the platen 118 moves (using motors, gears, pulleys, cables, guides, etc. (all generally illustrated by item 118)) toward the ITB 110 to have the platen 118 make contact with the ITB 110. Thereby, the ITB 110 transfers one of the developed layers 102 of the build materials 104 and the support material 105 to the platen 118 each time the platen 118 contacts the ITB 110, to successively form developed layers 102 of the build material 104 and the support material 105 on the platen 118.

More specifically, as shown in FIG. 3, at the transfer nip 130, the leading edge 134 of the developed layer 102 within the transfer nip 130 begins to be transferred to a corresponding location of the platen 118. Thus, in FIG. 3, the platen 118 moves to contact the developed layer 102 on the ITB 110 at a location where the leading edge 134 of the developed layer 102 is at the lowest location of the roller of the transfer nip 130. Thus, in this example, the trailing edge 136 of the developed layer 102 has not yet reached the transfer nip 130 and has not, therefore, yet been transferred to the platen 118.

Figure 4:
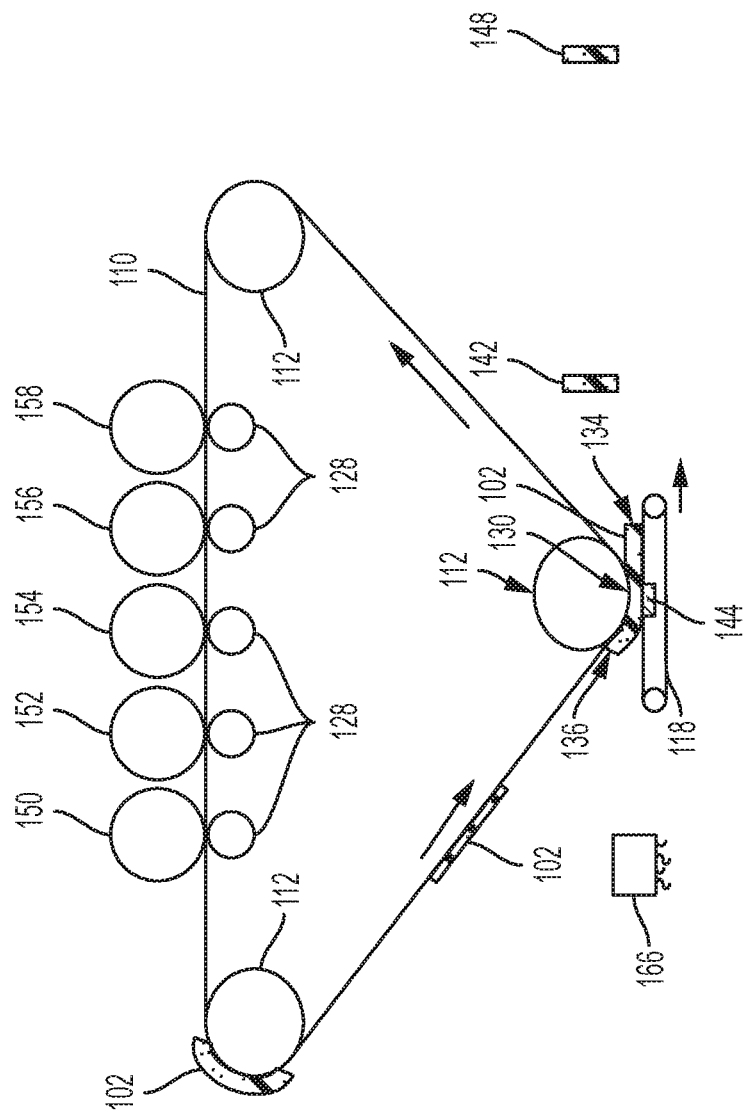
Figure 5:
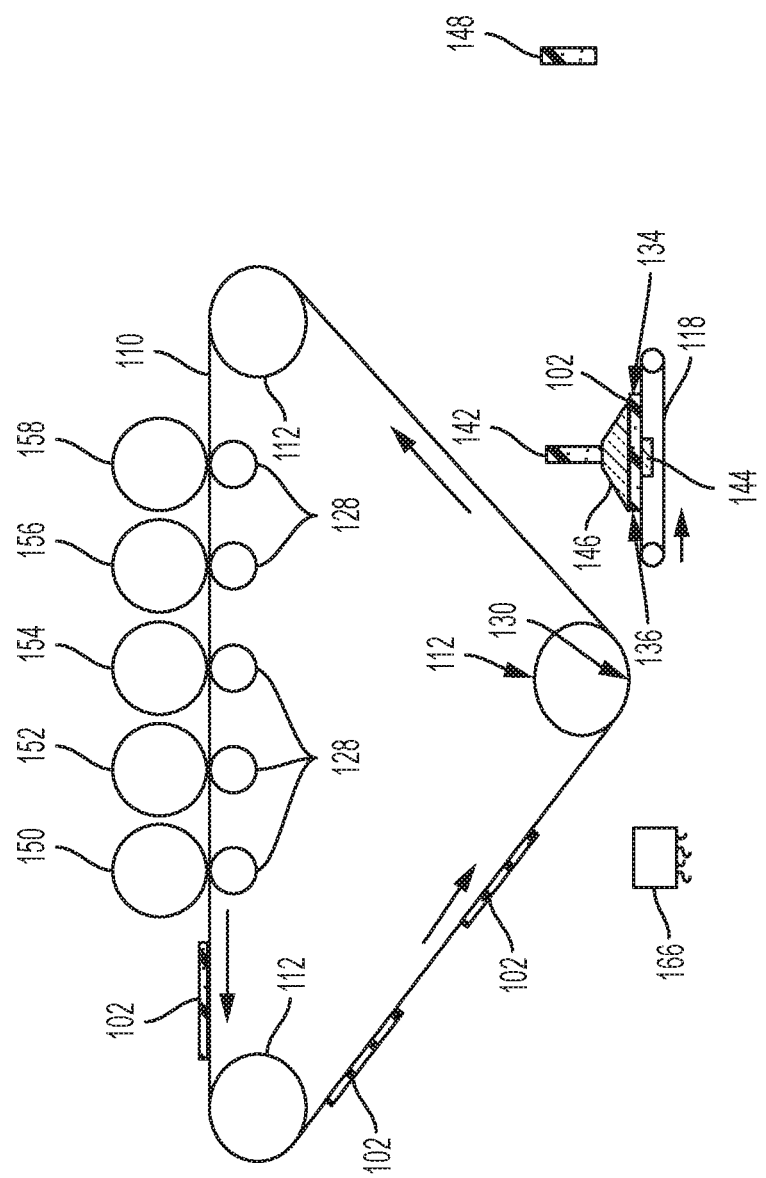

As shown in FIG. 4, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 4, the trailing edge 136 of the developed layer 102 is the only portion that has not yet reached the transfer nip 130 and has not, therefore, been transferred to the platen 118. Then, as the ITB 110 moves in the processing direction, the platen 118 moves at the same speed and in the same direction as the ITB 110, until the trailing edge 136 of the developed layer 102 reaches the bottom of the roller of the transfer nip 130, at which point the platen 118 moves away from the ITB 110 and over to the fusing station 142, as shown in FIG. 5.

The platen 118 can move to the fusing station 142 after each time the ITB 110 transfers each of the developed layers 102 to the platen 118 to independently fuse (using laser light 146) each of the developed layers 102 and successively join each developed layer 102 to the platen 118 and to any previously transferred developed layers 102 on the platen 118. In other alternatives, the platen 118 may only move to the fusing station 142 after a specific number (e.g., 2, 3, 4, etc.) of the developed layers 102 have been placed on the platen 118 to allow multiple developed layers 102 to be simultaneously fused to the platen 118 and to each other.

Figure 6A:
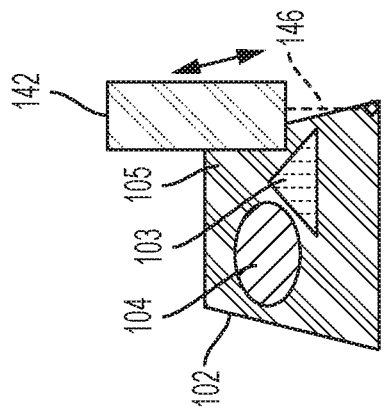
FIGS. 6A-6C are expanded schematic diagrams illustrating laser fusing devices herein.
Figure 6B:
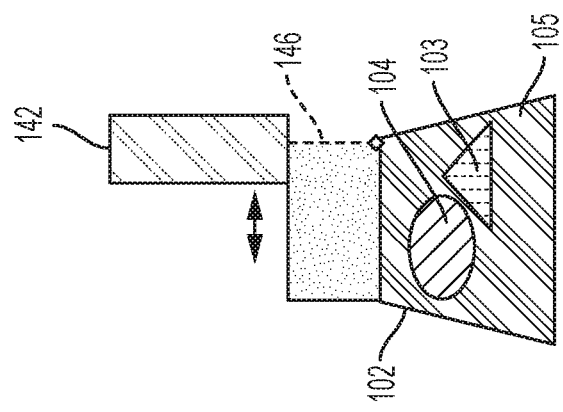
Figure 6C:
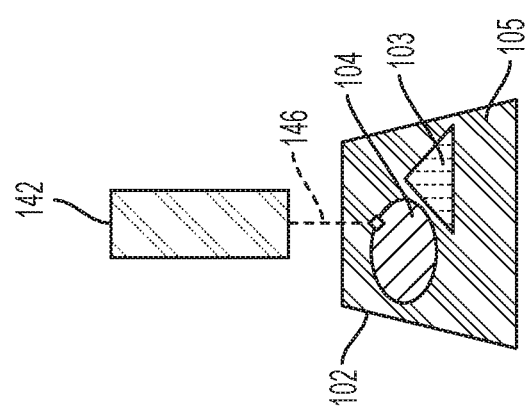

FIGS. 6A-6C illustrates one of the layers 102 being processed at the fusing station 142. More specifically, in FIG. 6A, laser light 146 fuses (melts, sinters, bonds, joins, binds, etc.) a portion of build materials 103 and 104, but may not fuse the support material 105. In one example, the system controlling the laser fusing device 142 can registered the develop layer 102 to the laser 142. With knowledge of the upcoming image, the laser 142 is adjusted to optimize the power applied to each different material 103, 104 within the layer 102.

As shown by the different shading in FIG. 6A, the fusing station 142 can supply different energy levels of laser light 146 (e.g., through different exposure times, different power levels, different wavelengths, etc.) to different portions of build material 103, 104 to fuse the different build materials 103, 104 differently (without applying any laser light 146 to the support material 105, thus preventing the support material 105 from fusing). Thus, the laser light 146 heats the different materials 103, 104 differently to fuse the portions of build material 103, 104 together, without heating the support material 10,5 to leave the support material 105 as a loose, unbound (e.g., powder or granular) material. The portions of build material 103, 104 to which laser light 146 is applied are less than all of the different materials within the layer 102 (thus, these portions of build material 103, 104 and the support material 105 are different portions of the same layer 102).

For example, different build materials 103 and 104 may be developed by different development devices (e.g. 152, 154) and therefore may comprise different materials, with different physical and fusing characteristics. Therefore, the laser fuse station 142 can supply different levels of energy to different portions of the layer 102 in order to cause the potentially different materials 103, 104 to be bonded together. In other situations, the fusing station 142 can apply different energies to different portions of the same build material (again represented in FIG. 6A by items 103 and 104) to cause different reactions within the material, so as to differentiate the fused materials and cause such materials to have different densities, different elasticities, different colors, different textures, etc., and thus distinguish items 103 and 104 in the final 3-D printed product that is output.

Note that fused materials may shrink. Therefore, if the build material 103, 104 is fused, and the support material 105 is not fused, this may create a height difference between the build and support materials, post-fusing. The development devices 150-158 compensate for this post-fusing height difference (e.g., between the fused build material and non-fused support material) by developing the layers 102 on the ITB 110 to have different pre-fusing thicknesses. Therefore, a specific development device (152-158) may deposit more material (a higher stack of material) on the ITB 110, relative to the other materials within a given layer 102, if it is known that such a material will shrink when fused by the laser fusing device 142. This ensures that, after fusing, the fused portions 103, 104 have the same height as the non-fused portions 105. This allows each new layer of fused build material that is formed within the 3-D item being printed to be planer, which keeps the 3-D item free of undesirable distortion.

FIGS. 6B and 6C illustrate that all the materials within the layer 102 can be blanket exposed by the laser fusing device 142 (in the X and/or Y directions, where the entire layer 102 is exposed to the laser light 146). In such situations, the support material 105 can be selected so that only the support material 105 is not affected by the laser light 146 (but all other portions of the layer 102 are fused by the laser light 146). For example, the support material 105 can be a non-sinterable material including ceramics, glass beads, sand, etc., that does not fuse or melt in the presence of the power of laser light energy being applied by the laser fusing device 142.

Regarding the fusing process, materials 102 can be fused (without being fully melted) by the laser light 146 heating such materials 102 to a temperature between their glass transition temperature and their melting temperature, to join the materials 102 as one, without affecting their shape or pattern, thereby creating a rigid structure. Those ordinarily skilled in the art would understand that the selection of build and support materials is coordinated with the power and exposure of the fusing process. Further, other fusing processing and components could be used, and the foregoing is presented only as one limited example; and the devices and methods herein are applicable to all such methods and components, whether currently known or developed in the future.

Figure 7:
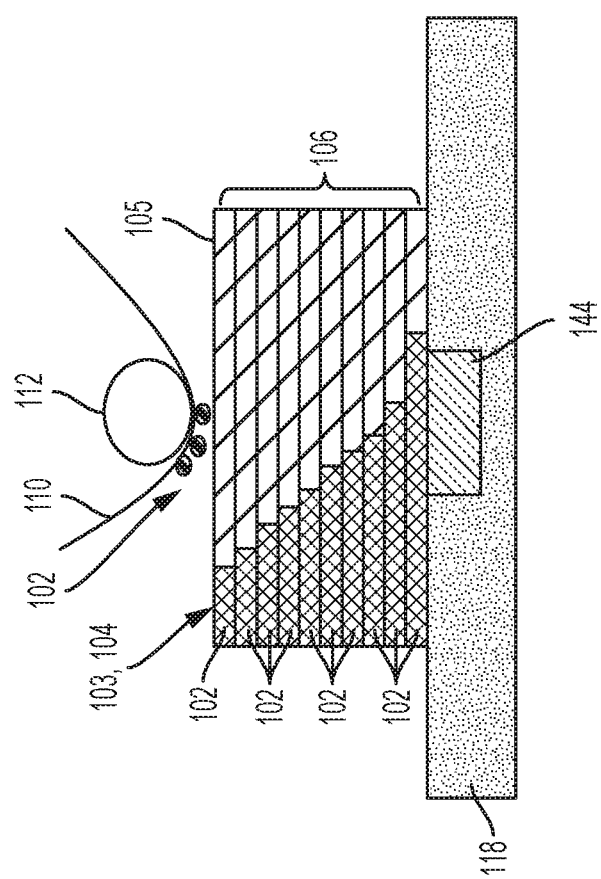
FIG. 7 is an expanded schematic diagram illustrating stacks of layers formed by devices herein.

Thus, the processing in FIGS. 2-5 is repeated to fuse multiple developed layers 102 into a stack 106, as shown in FIG. 7. The laser fusing station 142 not only fuses together the material within each of the developed layers 102, the laser fusing station 142 also fuses each developed player 102 to the immediately adjacent developed layer 102 that was most recently transferred to the platen 118 (e.g., joins layers 102 that contact one another on the platen 118).

Figure 8:
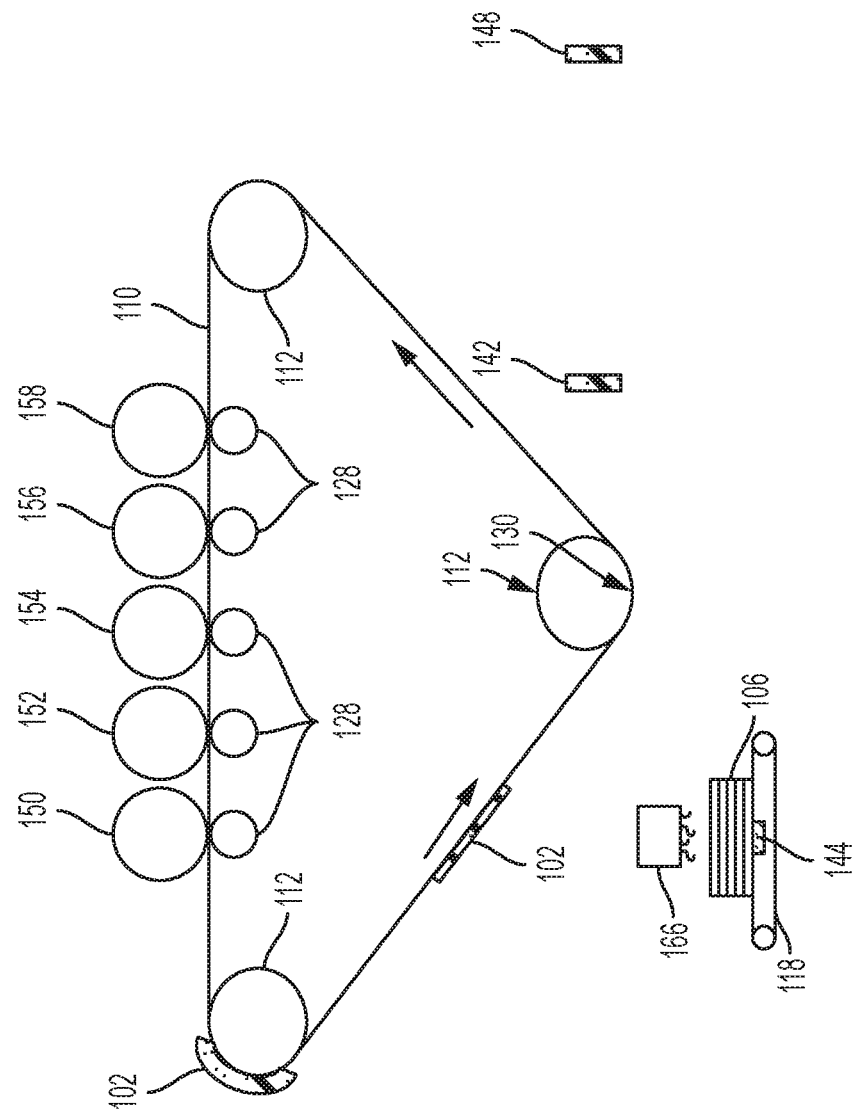
FIGS. 8-19 are schematic cross-section diagrams partially illustrating printing devices herein.

FIG. 8 illustrates that the adhesive application station 166 can be positioned to supply adhesive to the platen 118 (or to the top layers 102 thereon) before the platen returns to the transfer nip 130. Such adhesive promotes transfer of the layers 102 from the intermediate transfer surface 110 to the layers 102 on the platen 118 at the transfer station 130. The adhesive applied at station 166 can be any commercially available adhesive product that is selected to not affect the support or build materials, and can be applied by spraying, rolling, brushing, etc.

Figure 9:
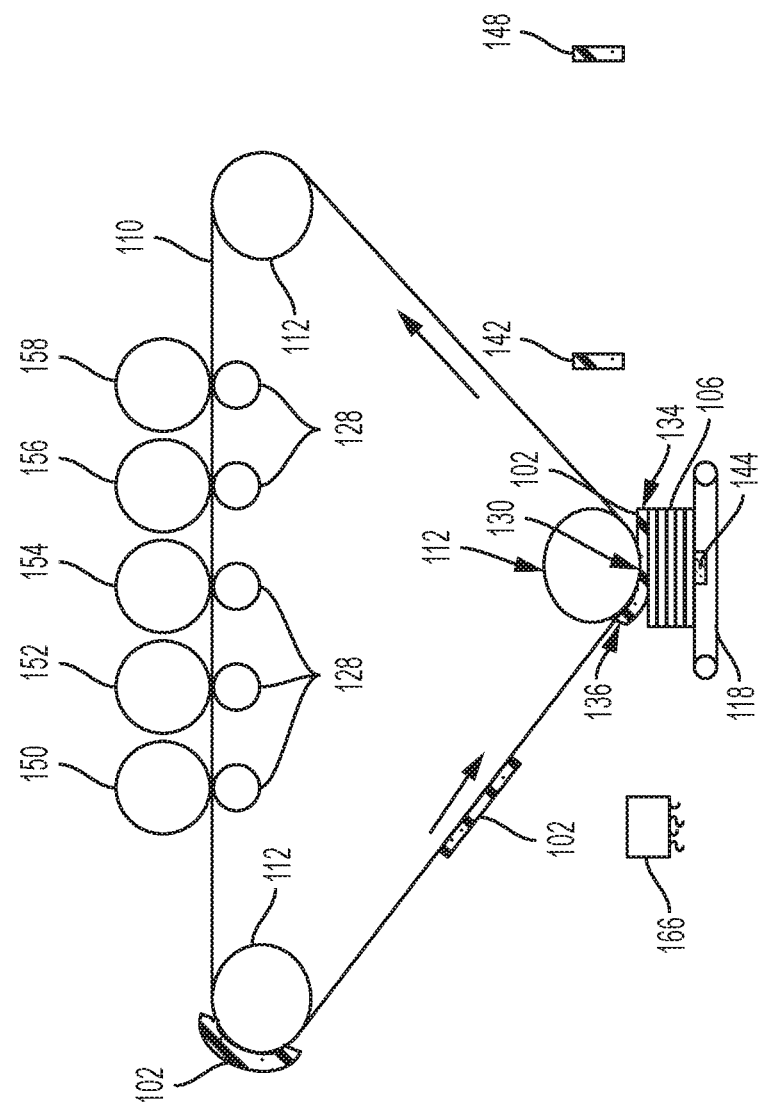
Figure 10:
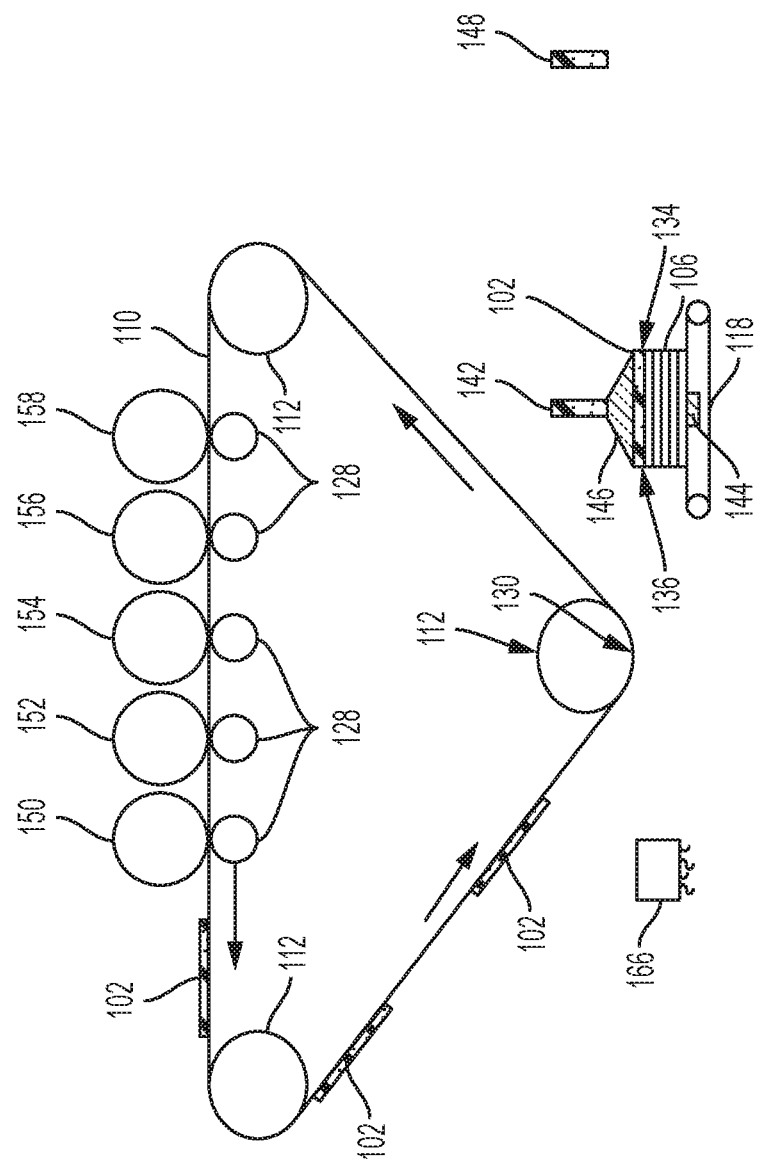
Figure 11:
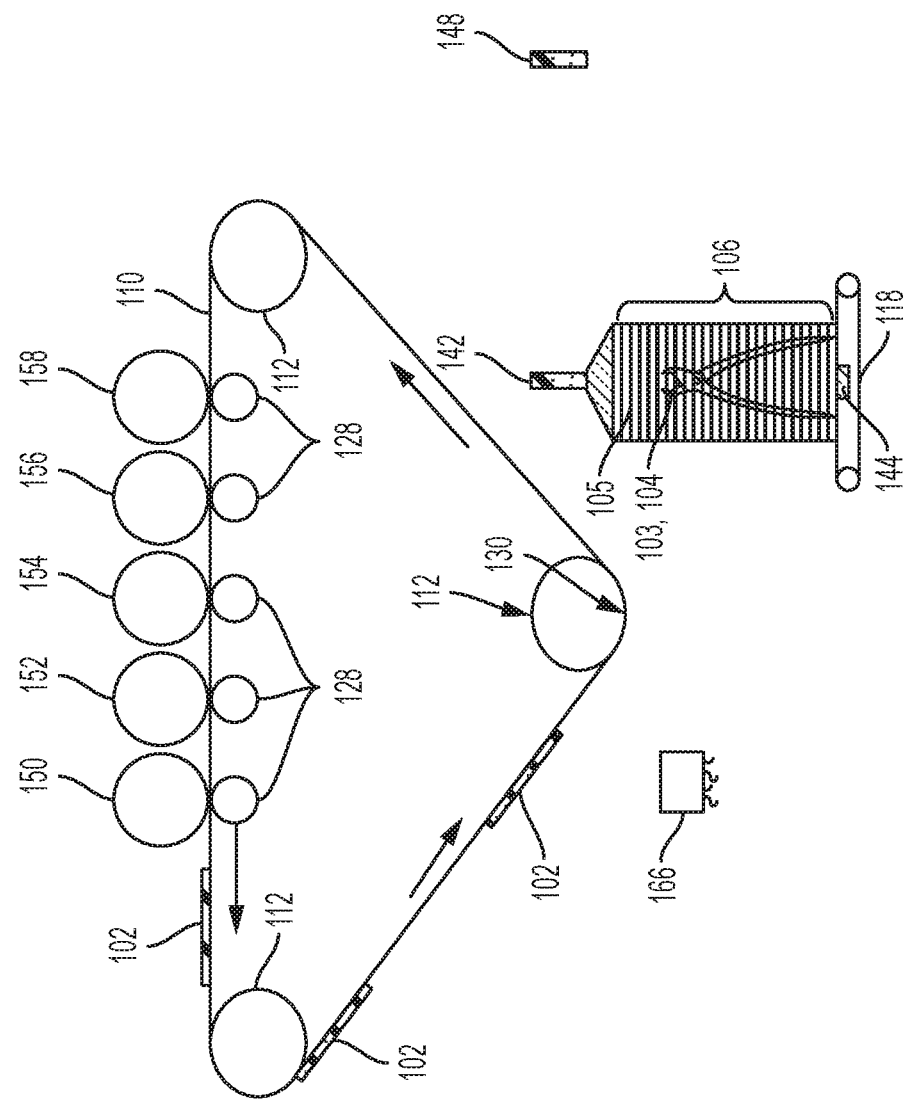

As the stack 106 of the developed layers 102 grows, additional developed layers 102 are formed on top of the stack 106, as shown in FIG. 9, and such additional developed layers 102 are fused together by the laser fusing station 142 in FIG. 10, to fuse all the develop layers 102 within the stack 106 together. In one example, the laser fusing station 142 can perform fusing after each time the ITB 110 transfers each of the developed layers 102 to the platen 118, or fusing can be performed less frequently such as only once (e.g., when the entire stack 106 is completely formed). In addition, FIG. 11 illustrates an overlay showing portions of support material 105 and build material 103, 104 within the accumulation of the freestanding stack 106 after all layers have been transferred to the platen 118 and fused. Such overlay may or may not be visible, and is only illustrated to show one exemplary way in which such build and support materials may be arranged.

Figure 12:
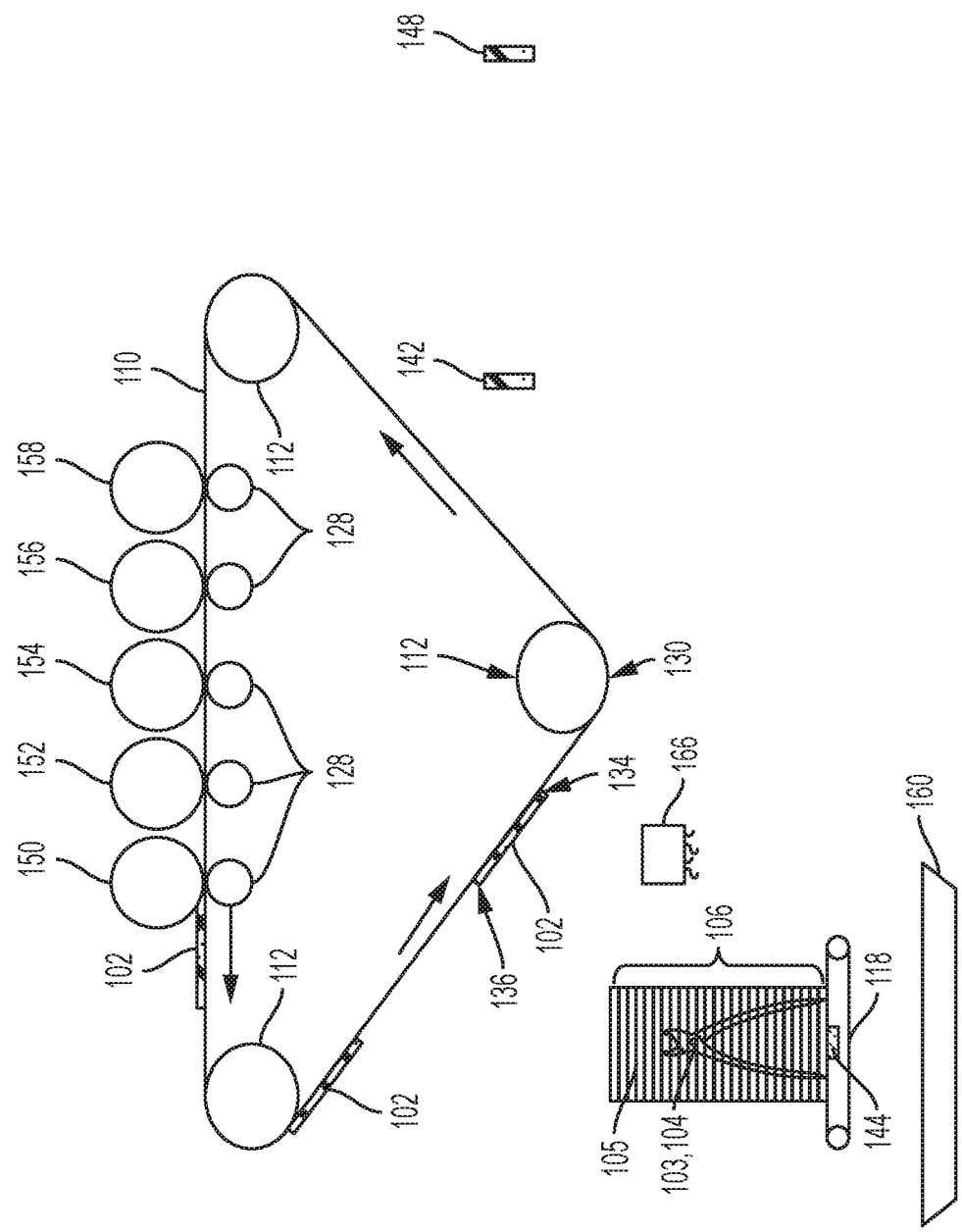
Figure 13:
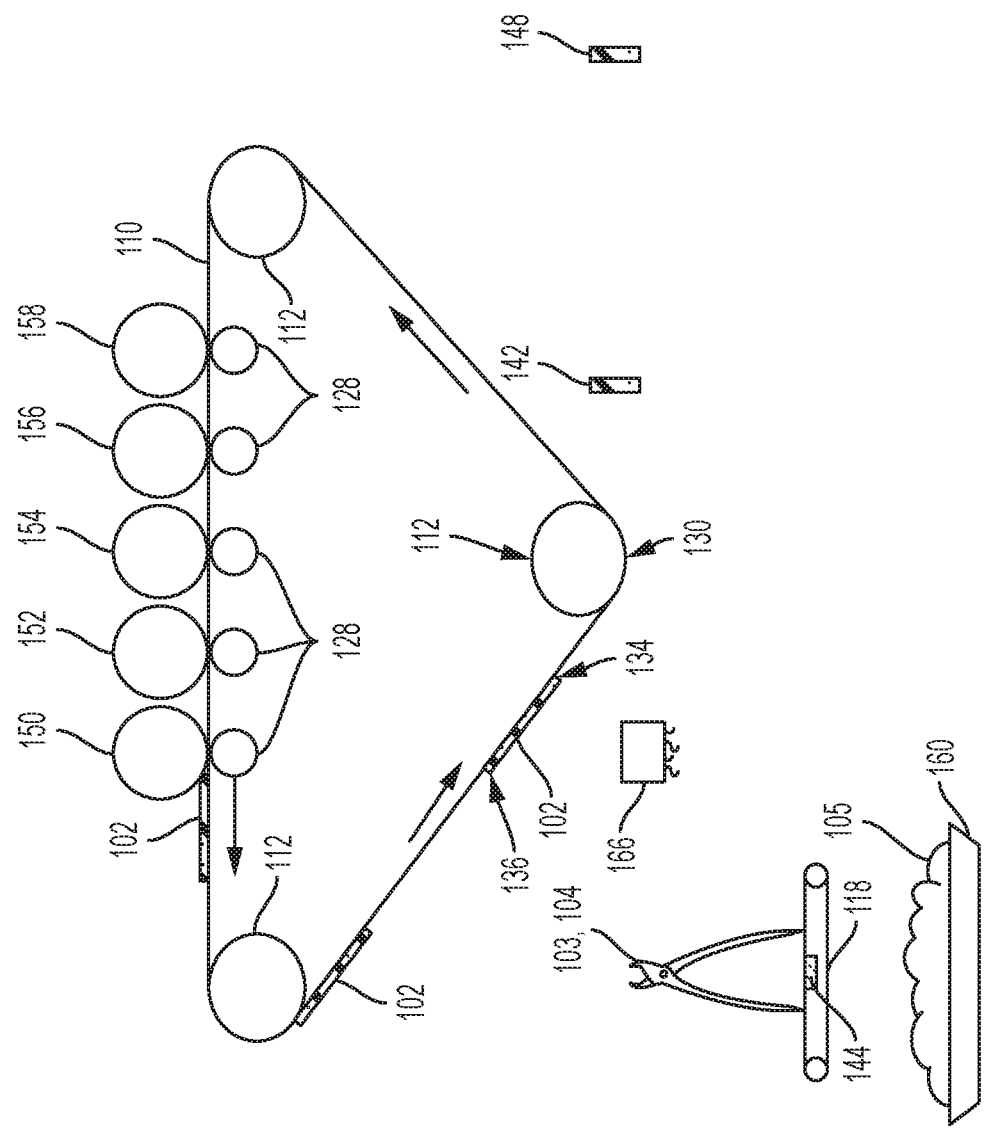

The 3-D structure of the freestanding stack 106 shown in FIG. 11 can be output to allow manual removal of the support material 105 using air pressure, an external solvent bath, etc; or automated processing can proceed as shown in FIG. 12-16. More specifically, as shown in FIG. 12, the platen 118 (with the freestanding stack 106 thereon) can move to be positioned above a collection tray 160. As shown in FIG. 13, the acoustic vibrator 144 can be actuated to vibrate the unfused support material 105 off the fused build material 103, 104 to leave the freestanding part 103, 104 of built material remaining on the platen 118. This allows the support material 105 to be collected in the collection tray 160 and potentially reused within the support material development device 150.

Figure 14:
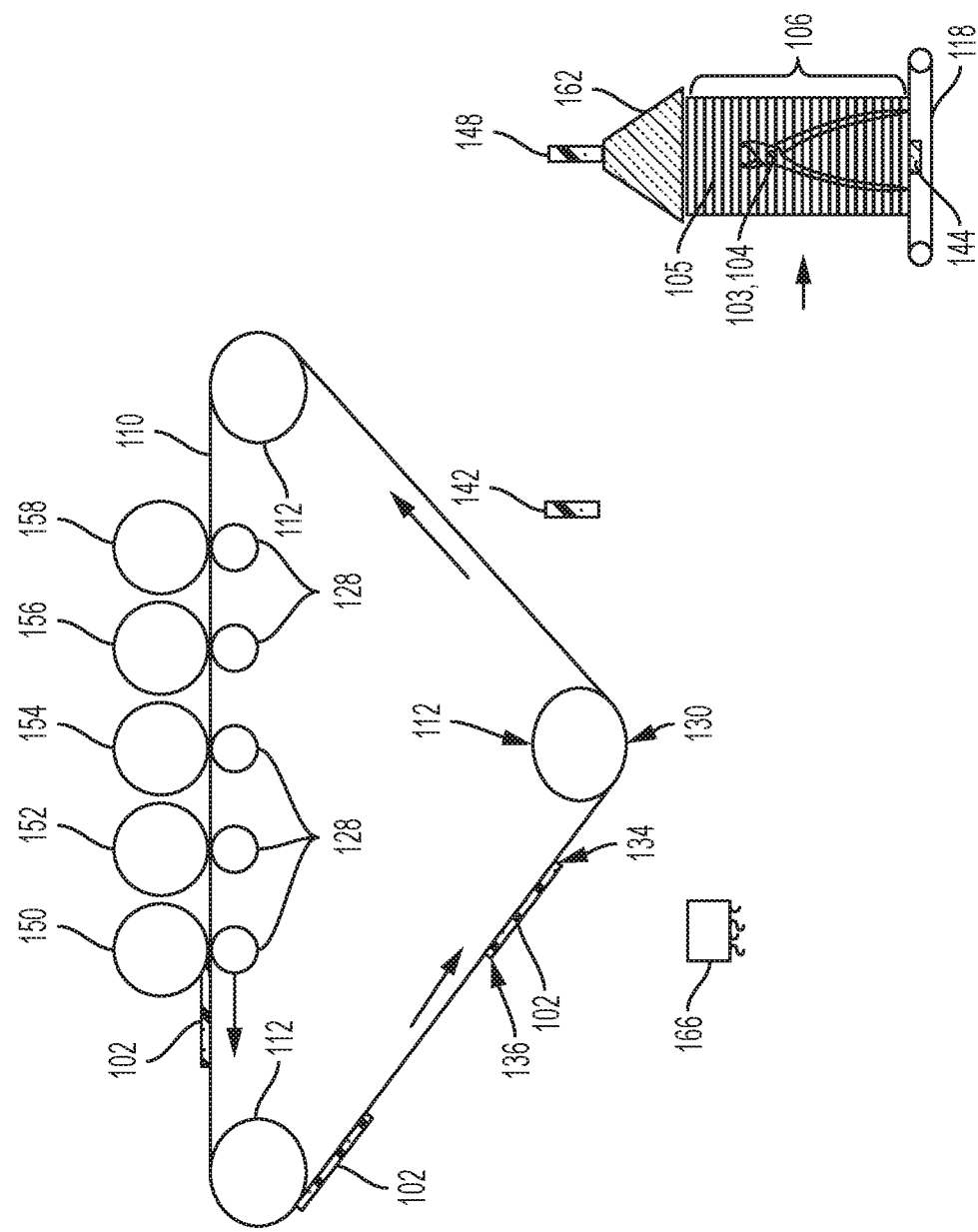
Figure 15:
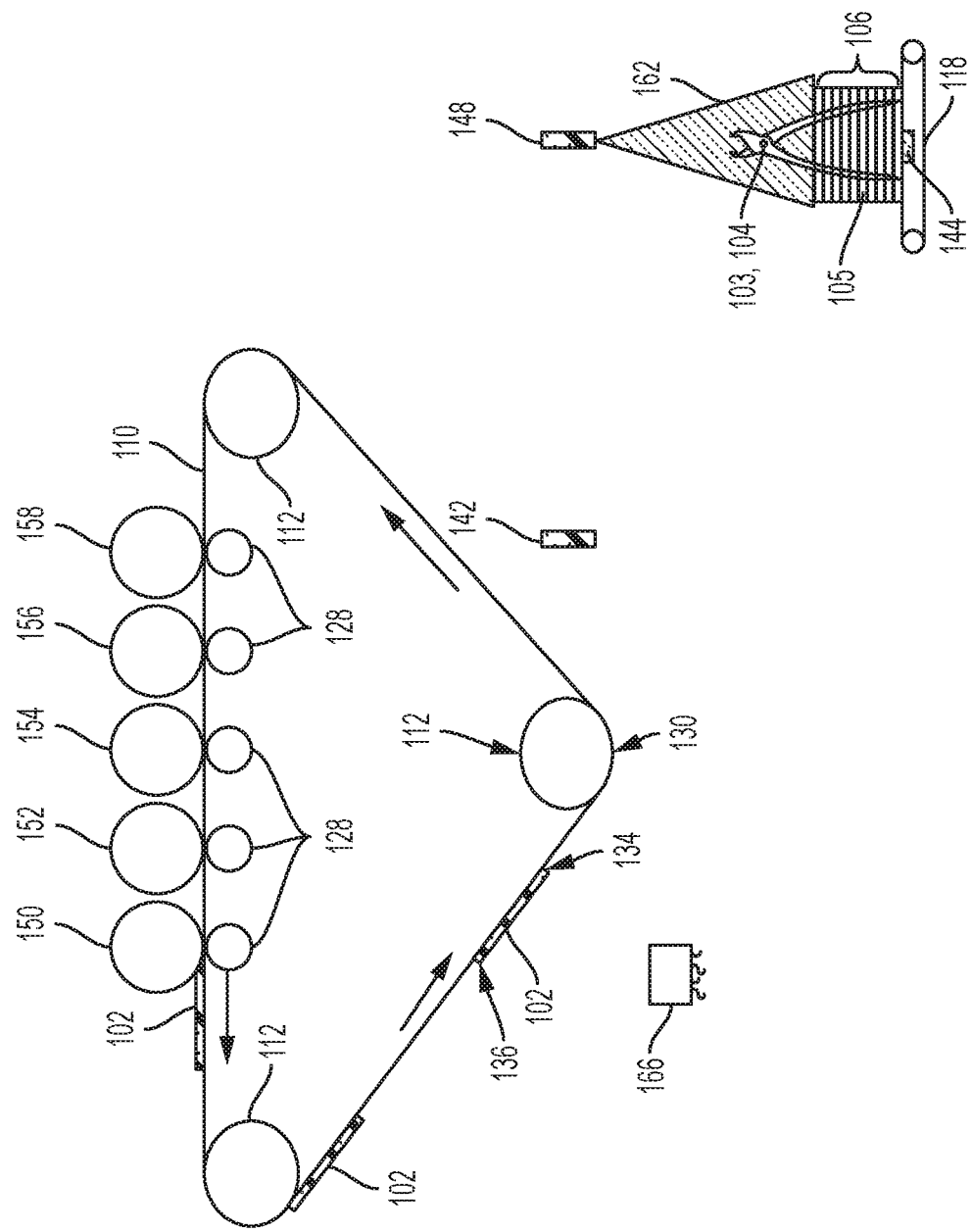
Figure 16:
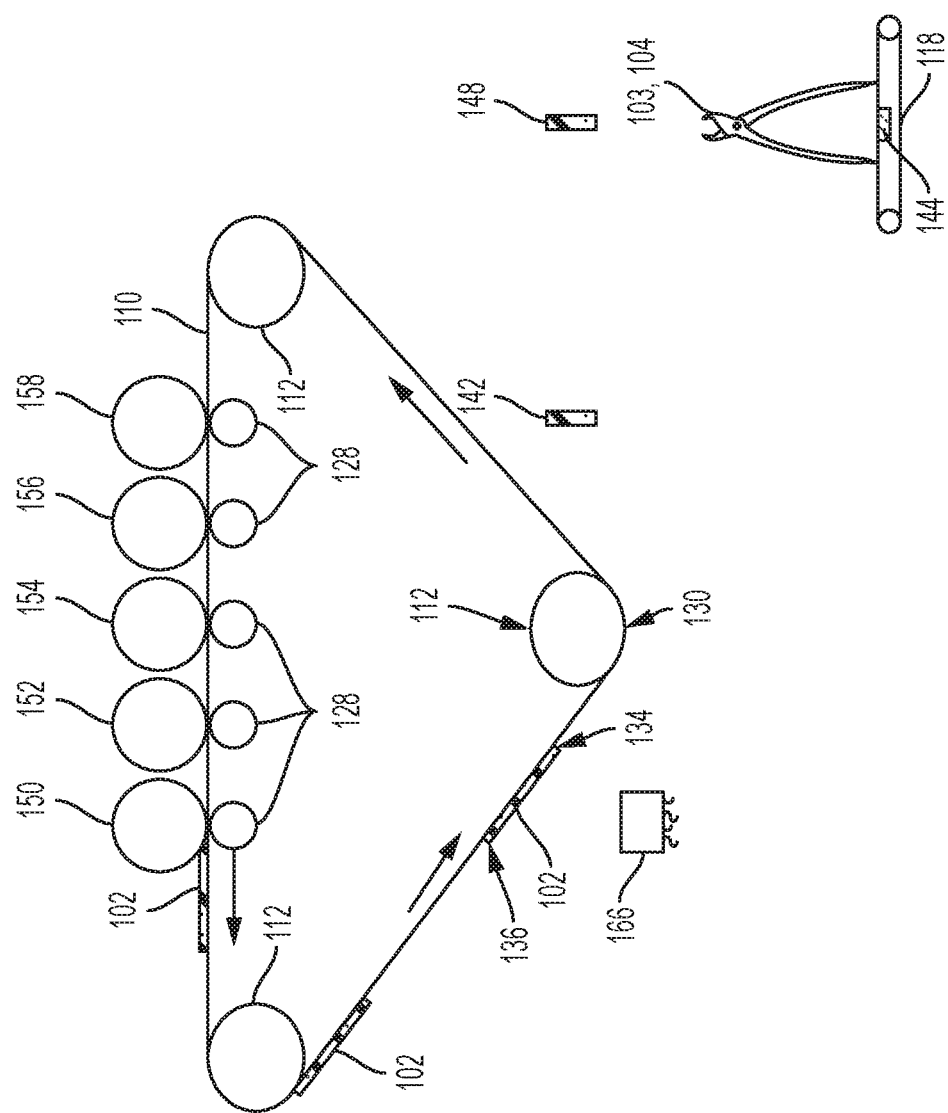

In another arrangement, in FIG. 14, the support material removal station 148 is positioned to receive the now fused 3-D freestanding stack 106 on the platen 118, as the platen 118 moves. The support material removal station 148 applies a solvent, water, air, etc., 162. Any solvent 162 applied by the support material removal station 148 is selected to dissolve the support material 105 without affecting the build material 103, 104. In one example 105 pressurized air 162 can be used to blow the unfused support material 105 off the fused build material 103, 104 (if the support material remains in powder or granular form). Again, as noted above, the solvent utilized will depend upon the chemical makeup of the build material 103, 104 and the support material 105. FIG. 15 illustrates the processing where about half of the support material 105 remains, and a portion of the build material 103, 104 protrudes from the remaining stack of support material 105. FIG. 16 illustrates processing after the support material removal station 148 has dissolved or removed all the support material 105, leaving only the build material 103, 104 remaining, which leave a completed 3-D structure made of only the build material 104.

Figure 17:
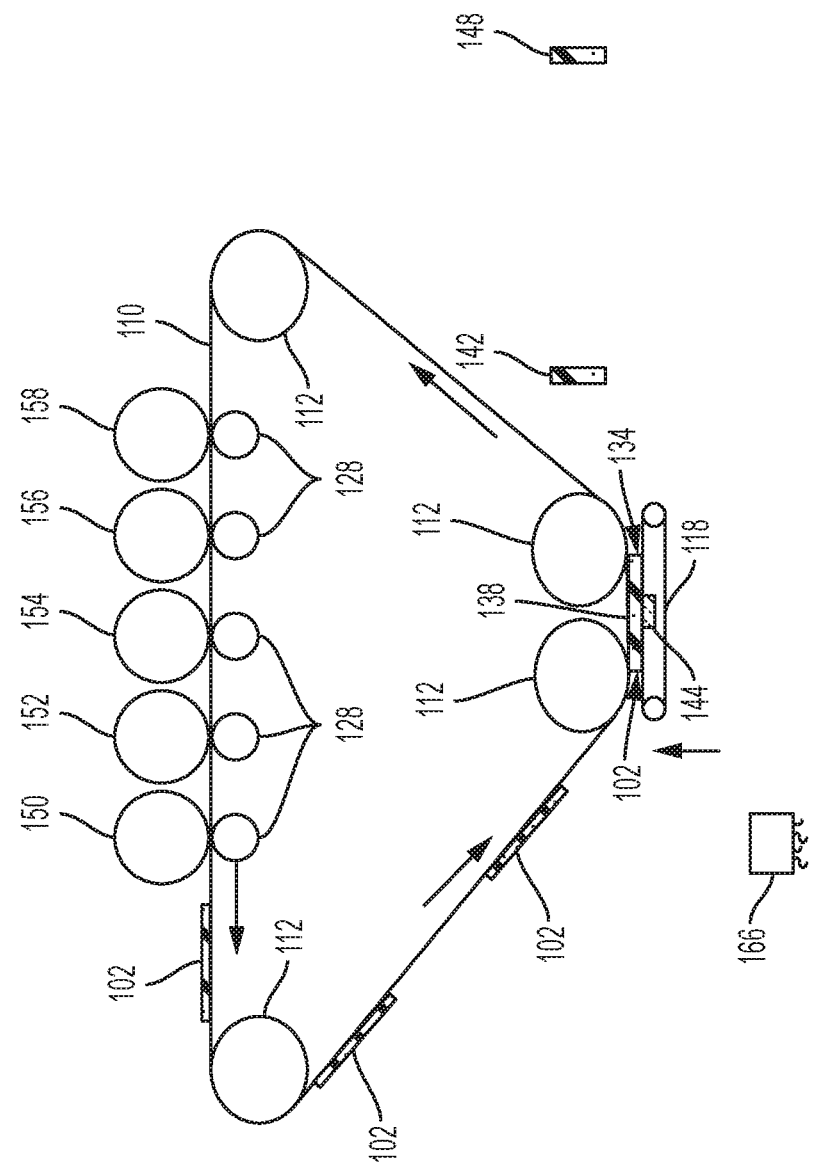
Figure 18:
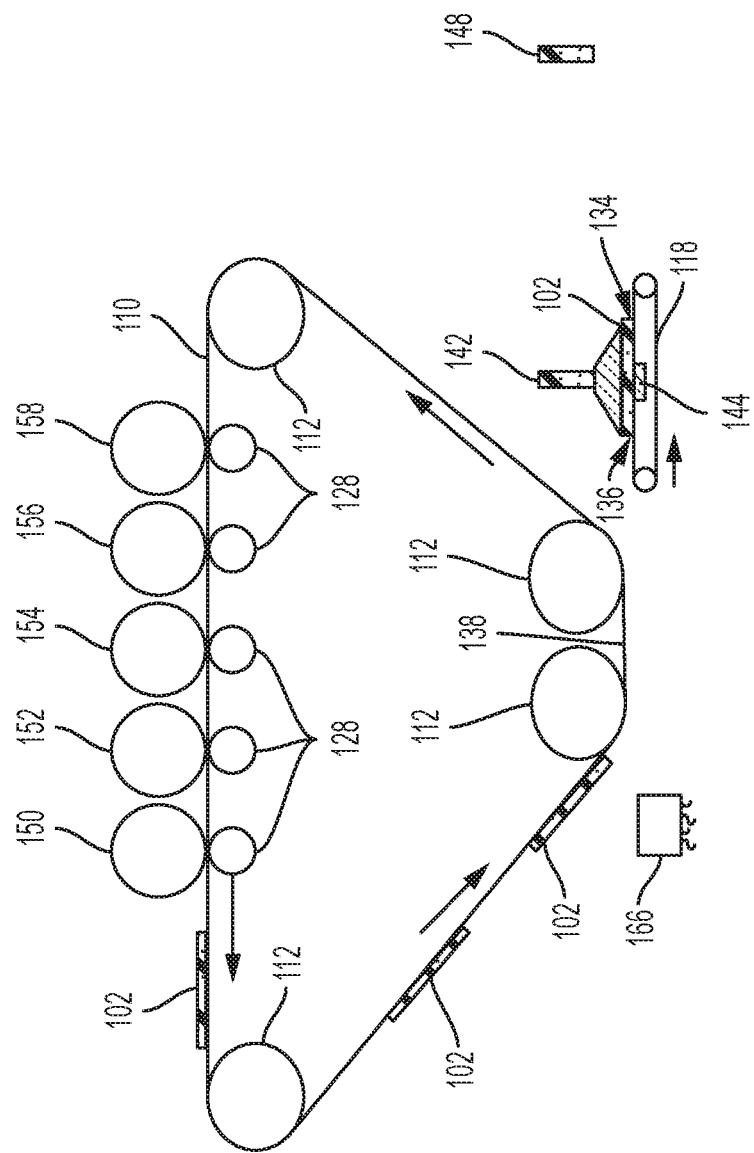

FIGS. 17 and 18 illustrate an alternative 3-D electrostatic printing structure herein that includes a planar transfer station 138 in place of the transfer nip 130 shown in FIG. 1. As shown in FIG. 17, the planar transfer station 138 is a planar portion of the ITB 110 that is between rollers 112 and is parallel to the platen 118. As shown in FIG. 17, with this structure, when the platen 118 moves to contact the planar transfer station 138, all of the developed layer 102 is transferred simultaneously to the platen 118 or partially formed stack 106, avoiding the rolling transfers process shown in FIGS. 3 and 4. As discussed above, the layers 102 are selectively laser fused using fusing station 142, as shown in FIG. 18.

Figure 19:
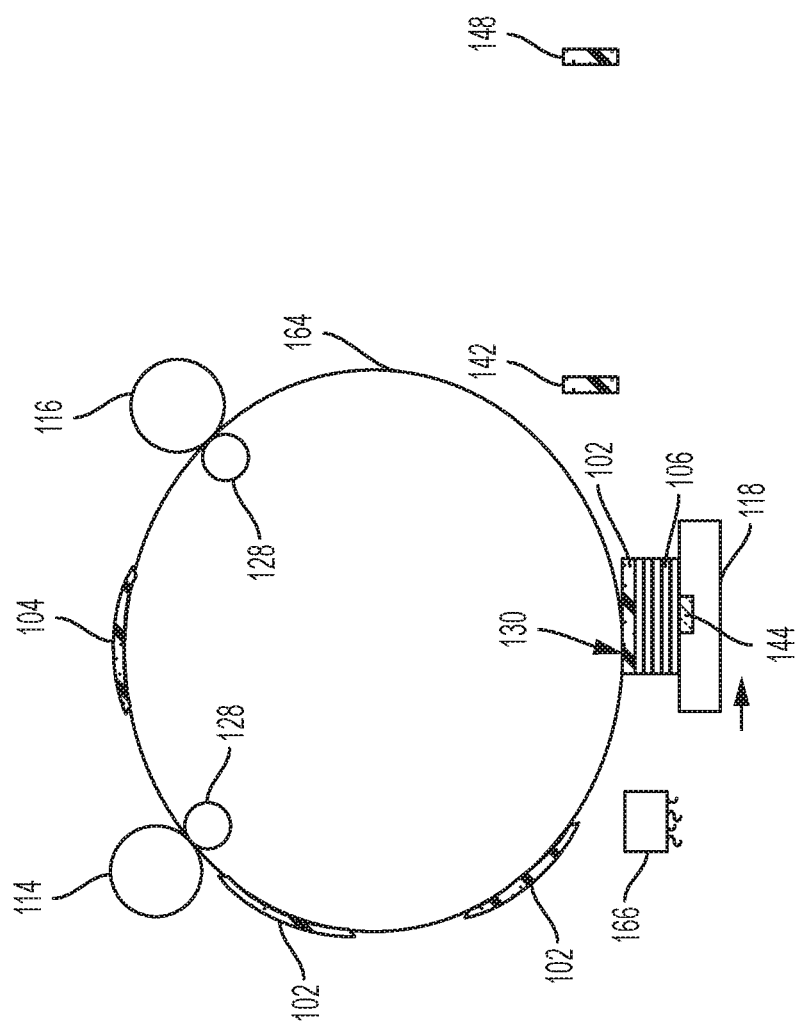

Similarly, as shown in FIG. 19, a drum 164 could be used in place of the ITB 110, with all other components operating as described herein. Thus, the drum 164 could be an intermediate transfer surface receiving material from development stations 152-158, as described above, or could be a photoreceptor and operate as the photoreceptor 256 described below operates, by maintaining a latent image of charge and receiving materials from development devices 254.

Figure 20:
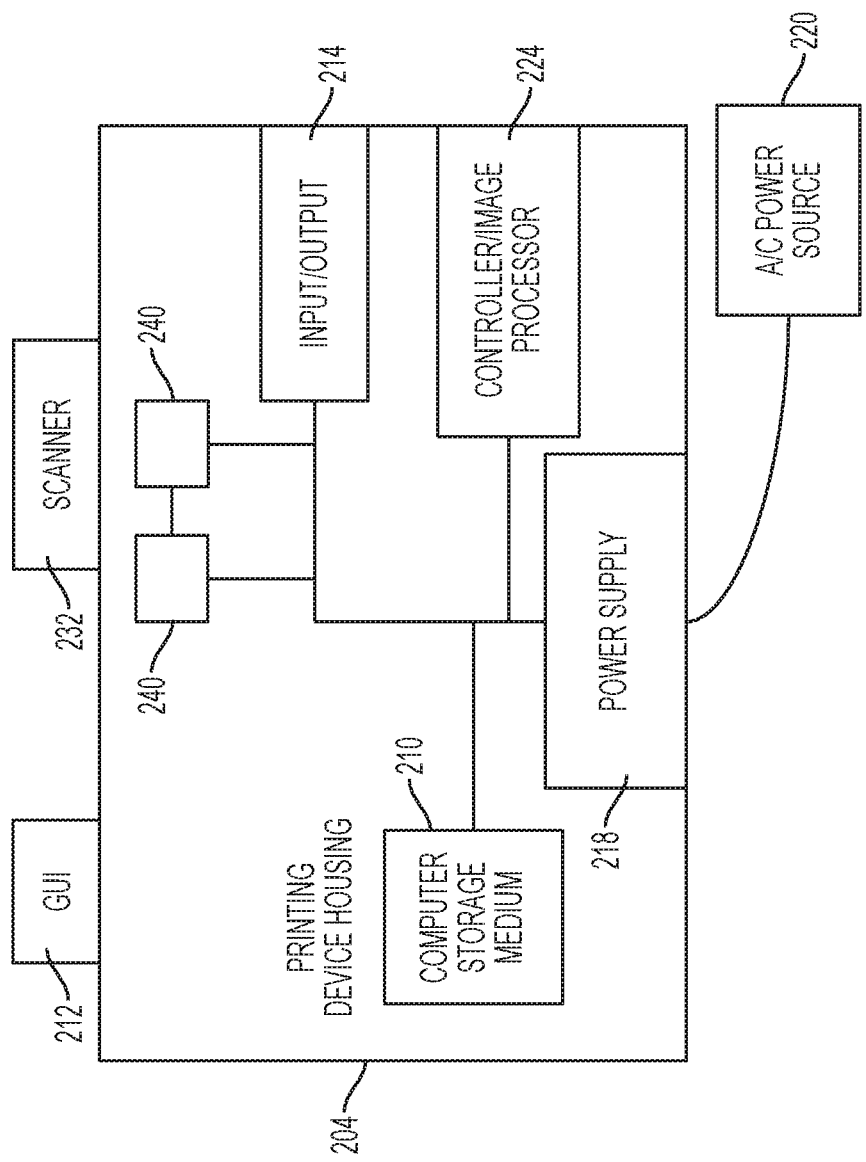
FIG. 20 is a schematic diagram illustrating a 3-D printing device herein.

FIG. 20 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 20, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 21:
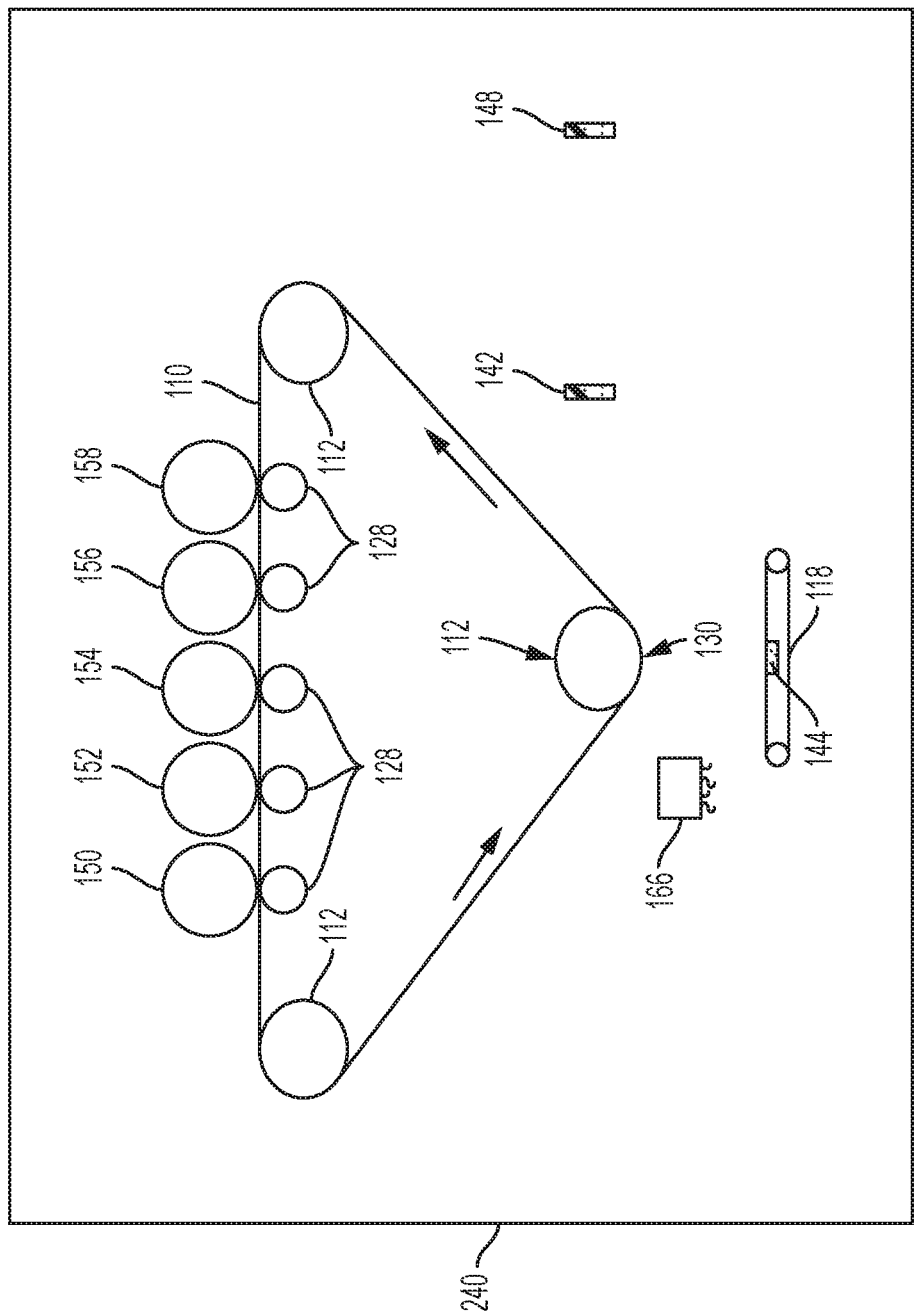
FIG. 21 is a schematic diagram illustrating a printing engine herein.

The one or more printing engines 240 are intended to illustrate any marking device that applies build and support materials (toner, etc.) whether currently known or developed in the future and can include, for example, devices that use an intermediate transfer belt 110 (as shown in FIG. 21).

Thus, as shown in FIG. 21, each of the printing engine(s) 240 shown in FIG. 20 can utilize one or more potentially different (e.g., different color, different material, etc.) build material development stations 152-158, one or more potentially different (e.g., different color, different material, etc.) support material development stations 150, etc. The development stations 152-158 can be any form of development station, whether currently known or developed in the future, such as individual electrostatic marking stations, individual inkjet stations, individual dry ink stations, etc. Each of the development stations 150-158 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 21 illustrates five development stations adjacent or in contact with a rotating belt (110), as would be understood by those ordinarily skilled in the art, such devices could use any number of marking stations (e.g., 2, 3, 5, 8, 11, etc.).

Figure 22:
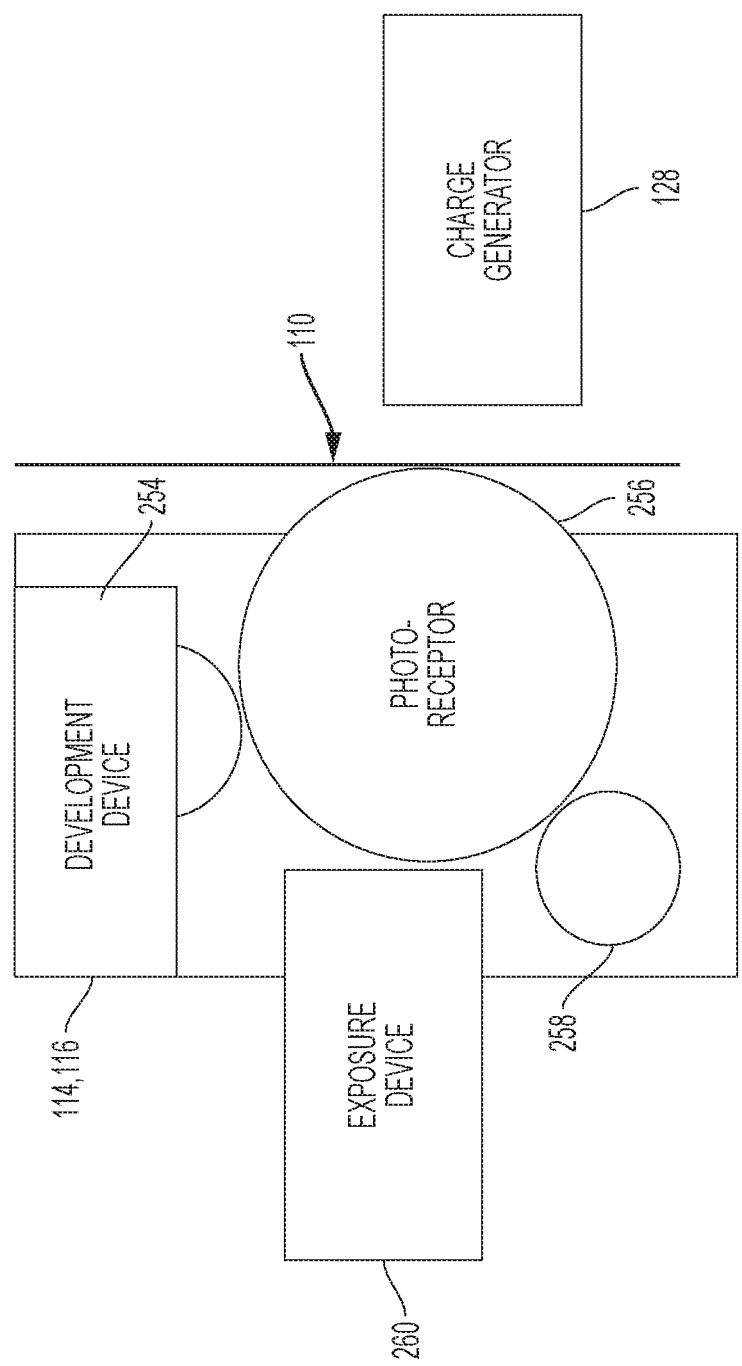
FIG. 22 is an expanded schematic diagram illustrating a development device herein.

One exemplary individual electrostatic development station 152-158 is shown in FIG. 22 positioned adjacent to (or potentially in contact with) intermediate transfer belt 110. Each of the individual electrostatic development stations 152-158 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
    an intermediate transfer surface;
    development stations positioned to electrostatically transfer layers of different materials combined together to said intermediate transfer surface, said different materials comprise at least two different build materials and a support material;
    a transfer station adjacent said intermediate transfer surface, said transfer station is positioned to receive said layers as said intermediate transfer surface moves past said transfer station;
    a platen moving relative to said intermediate transfer surface, said intermediate transfer surface transfers a layer of said different materials combined together to said platen each time said platen contacts one of said layers on said intermediate transfer surface at said transfer station to successively form a freestanding stack of said layers on said platen;
    a fusing station positioned to apply light to said layer after said layer is transferred from said transfer station to said platen, said fusing station selectively applies different amounts of said light to said different build materials to sinter said different build materials differently within said layer, said fusing station controls said light to prevent said light from heating said support material within said layer, to leave said support material as a loose, unbound material; and
    a material removal station positioned to remove said support material as said loose, unbound material, and leave said different build materials fused as a 3-D printed part.

2. The 3-D printer according to claim 1, said light heats said different build materials to sinter said different build materials together, without heating said support material.

3. The 3-D printer according to claim 1, said different build materials and said support material are different portions of said layer.

4. The 3-D printer according to claim 1, said material removal station comprises an acoustic vibrator.

5. The 3-D printer according to claim 1, further comprising an adhesive station positioned to supply adhesive to said platen, said adhesive promotes transfer of said layers from said intermediate transfer surface to said layers on said platen at said transfer station.

6. The 3-D printer according to claim 1, said development stations and said transfer station are positioned relative to said intermediate transfer surface such that a point on said intermediate transfer surface, when said intermediate transfer surface moves in a process direction, first passes said development stations and then passes said transfer station.

7. A three-dimensional (3-D) printer comprising:
an intermediate transfer surface;
development stations positioned to electrostatically transfer layers of different materials combined together to said intermediate transfer surface, said different materials comprise at least two different build materials and a support material;
a transfer station adjacent said intermediate transfer surface, said transfer station is positioned to receive said layers as said intermediate transfer surface moves past said transfer station;
a platen moving relative to said intermediate transfer surface, said intermediate transfer surface transfers a layer of said different materials combined together to said platen each time said platen contacts one of said layers on said intermediate transfer surface at said transfer station to successively form a freestanding stack of said layers on said platen;
a laser fusing station positioned to apply laser light to each said layer after said layer is transferred from said transfer station to said platen, said laser fusing station selectively applies different amounts of said light to said different build materials to sinter said different build materials differently within said layer, said fusing station controls said light to prevent said light from heating said support material within said layer, to leave said support material as a loose, unbound material; and
a material removal station positioned to remove said support material as said loose, unbound material, and leave said different build materials fused as a 3-D printed part,
wherein said laser fusing station selectively applies different amounts of said light to said different build materials to differentiate said different build materials in said 3-D printed part.

8. The 3-D printer according to claim 7, said laser light heats said different build materials to sinter said different build materials together, without heating said support material.

9. The 3-D printer according to claim 7, said different build materials and said support material are different portions of said layer.

10. The 3-D printer according to claim 7, said materials removal station comprises an acoustic vibrator.

11. The 3-D printer according to claim 7, further comprising an adhesive station positioned to supply adhesive to said platen, said adhesive promotes transfer of said layers from said intermediate transfer surface to said layers on said platen at said transfer station.

12. The 3-D printer according to claim 7, said development stations and said transfer station are positioned relative to said intermediate transfer surface such that a point on said intermediate transfer surface, when said intermediate transfer surface moves in a process direction, first passes said development stations and then passes said transfer station.

13. A three-dimensional (3-D) printer comprising:
an intermediate transfer surface;
development stations positioned to electrostatically transfer layers of different materials combined together to said intermediate transfer surface, said different materials comprise at least two different build materials and a support material;
a transfer station adjacent said intermediate transfer surface, said transfer station is positioned to receive said layers as said intermediate transfer surface moves past said transfer station;
a platen moving relative to said intermediate transfer surface, said intermediate transfer surface transfers a layer of said different materials combined together to said platen each time said platen contacts one of said layers on said intermediate transfer surface at said transfer station to successively form a freestanding stack of said layers on said platen;
a laser fusing station positioned to apply laser light to each said layer after said layer is transferred from said transfer station to said platen, said laser fusing station selectively applies different amounts of said light to said different build materials to sinter said different build materials differently within said layer, said fusing station controls said light to prevent said light from heating said support material within said layer, to leave said support material as a loose, unbound material; and
a material removal station positioned to remove said support material as said loose, unbound material, and leave said different build materials fused as a 3-D printed part,
wherein said laser fusing station selectively applies different amounts of said light to said different build materials to differentiate said different build materials in said 3-D printed part and cause said different build materials to have at least one of different densities, different elasticities, different colors, and different textures.

14. The 3-D printer according to claim 13, said laser light heats said different build materials to sinter said different build materials together, without heating said support material.

15. The 3-D printer according to claim 13, said different build materials and said support material are different portions of said layer.

16. The 3-D printer according to claim 13, said materials removal station comprises an acoustic vibrator.

17. The 3-D printer according to claim 13, further comprising an adhesive station positioned to supply adhesive to said platen, said adhesive promotes transfer of said layers from said intermediate transfer surface to said layers on said platen at said transfer station.

* * * * *